US009786889B2

(12) United States Patent
Kim

(10) Patent No.: US 9,786,889 B2
(45) Date of Patent: Oct. 10, 2017

(54) ELECTRODE ASSEMBLY OF SECONDARY BATTERY

(71) Applicant: SK INNOVATION CO., LTD., Seoul (KR)

(72) Inventor: Min Seong Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 108 days.

(21) Appl. No.: 14/428,236

(22) PCT Filed: Sep. 5, 2013

(86) PCT No.: PCT/KR2013/008015
§ 371 (c)(1),
(2) Date: Mar. 13, 2015

(87) PCT Pub. No.: WO2014/046403
PCT Pub. Date: Mar. 27, 2014

(65) Prior Publication Data
US 2015/0263323 A1   Sep. 17, 2015

(30) Foreign Application Priority Data

Sep. 24, 2012 (KR) .................. 10-2012-0105678

(51) Int. Cl.
*H01M 2/16* (2006.01)
*H01M 10/42* (2006.01)
*H01M 10/058* (2010.01)
*H01M 10/052* (2010.01)

(52) U.S. Cl.
CPC ..... *H01M 2/1673* (2013.01); *H01M 10/4235* (2013.01); *H01M 10/052* (2013.01); *H01M 10/058* (2013.01)

(58) Field of Classification Search
None
See application file for complete search history.

(56) References Cited

U.S. PATENT DOCUMENTS

| 7,951,479 | B2 | 5/2011 | Kelley et al. | |
| 2004/0142235 | A1* | 7/2004 | Parsian | H01M 4/64 429/128 |
| 2005/0255378 | A1 | 11/2005 | Knight et al. | |
| 2006/0257726 | A1* | 11/2006 | Kelley | H01M 2/18 429/142 |
| 2008/0100990 | A1 | 5/2008 | Buiel et al. | |
| 2012/0196167 | A1 | 8/2012 | Kim et al. | |

FOREIGN PATENT DOCUMENTS

| JP | 05-205725 | 8/1993 |
| KR | 1020110081038 | 7/2011 |

* cited by examiner

*Primary Examiner* — Patrick Ryan
*Assistant Examiner* — Wyatt McConnell
(74) *Attorney, Agent, or Firm* — IP & T Group LLP

(57) ABSTRACT

Provided is an electrode assembly of a secondary battery, including: a first electrode unit and a second electrode unit; a separation membrane interposed between the first electrode unit and the second electrode unit; and a first coating unit having an insulating member which is made of a metal oxide material and is coated along front and rear edge portions of the first electrode unit.

9 Claims, 7 Drawing Sheets

ELECTRODE ASSEMBLY OF SECONDARY BATTERY

This application is a national stage application of PCT/KR2013/008015 filed on Sep. 5, 2013, which claims priority of Korean patent application number 10-2012-0105678 filed on Sep. 24, 2012. The disclosure of each of the foregoing applications is incorporated herein by reference in its entirety.

TECHNICAL FIELD

The present invention relates to an electrode assembly of a secondary battery which may be charged and discharged.

BACKGROUND ART

Recently, a rechargeable secondary battery has been widely used as an energy source of a wireless mobile device.

In addition, the secondary battery has been interested as a power source of an electric vehicle (EV), a hybrid electric vehicle (HEV), and the like, that have been suggested as a scheme for solving air pollution of the existing gasoline vehicle, diesel vehicle, or the like, using a fossil fuel.

Small-sized mobile devices use one or several battery cells per one device. In contrast, medium or large-sized devices such as a vehicle, or the like, use a medium and large-sized battery pack in which a plurality of battery cells are electrically interconnected as a unit cell, to meet the needs of high output and large capacity.

Since it is preferable that the medium or large-sized battery packs are manufactured to have a size and a weight as small as possible, they may be stacked with high integration. In addition, a prismatic battery, a pouch type battery, or the like, having a small weight against a capacity has been mainly used as a battery cell of the medium or large-sized battery pack. Among those, the pouch type battery having a small weight, less leakage possibility of an electrolyte, and low manufacturing costs has drawn much attention.

As unit batteries (battery cells) of the medium or large-sized battery pack, nickel-hydrogen secondary batteries have been mainly used. However, recently, many studies on lithium secondary batteries providing high output against capacity like the small battery pack, have been conducted, and some of the lithium secondary batteries have been commercialized.

However, the lithium secondary battery basically has low stability. The lithium secondary battery has an electrode assembly which is accommodated in a case into which an electrolyte is injected. In this case, when the electrode assembly is overcharged to increase a current and a voltage, the electrolyte inside the case is decomposed due to overheating to generate inflammable gas, and as a result, a swelling phenomenon that the case itself is swollen occurs. In this case, heat is not diffused inside the case as a whole and excessively diffused at a specific position of the case, and thus a separation membrane is melted between a cathode and an anode. As a result, the cathode and the anode are short-circuited and thus ignition occurs.

As described above, there is a need to develop an electrode assembly of a secondary battery for solving a problem of an internal short circuit which occurs due to an internal deformation under the overcharging condition.

RELATED ART DOCUMENT

Patent Document

US 20120196167 A1 (2012 Aug. 2)

DISCLOSURE

Technical Problem

An object of the present invention is to provide an electrode assembly of a secondary battery capable of preventing an internal short circuit which occurs due to an internal deformation under the overcharging condition.

Technical Solution

In one general aspect, an electrode assembly of a secondary battery includes: a first electrode unit and a second electrode unit; a separation membrane interposed between the first electrode unit and the second electrode unit; and a first coating unit having an insulating member which is made of a metal oxide material and is coated along front and rear edge portions of the first electrode unit.

The electrode assembly may further include: a second coating unit having an insulating member which is made of a metal oxide material and is coated along front and rear surface edge portions of the second electrode unit.

The first electrode unit and the second electrode unit may have a rectangular plate shape and an electrode tab for power connection may protrude in one way or two ways of the rectangular plate and the first coating unit and the second coating unit may be each coated on the edge portion of the rest sides other than sides at which the electrode tabs of the first electrode unit and the second electrode unit are present.

A thickness each of the first coating unit and the second coating unit may ranges from 1 µm to 2 mm.

The first electrode unit may be a cathode which includes a cathode current collector and a cathode active material coated on the cathode current collector and the second electrode unit may be an anode which includes an anode current collector and an anode active material coated on the anode current collector.

The metal oxide may be any one selected from a group consisting of aluminum (Al), silicon (Si), titanium (Ti), vanadium (V), chromium (Cr), manganese (Mn), iron (Fe), cobalt (Co), nickel (Ni), zinc (Zn), zirconium (Zr), niobium (Nb), molybdenum (Mo), and barium (Ba).

Advantageous Effects

According to the exemplary embodiments of the present invention, it is possible to secure the stability of the electrode assembly of a secondary battery by preventing the internal short circuit which occurs due to the internal deformation under the overcharging condition.

Further, according to the exemplary embodiments of the present invention, it is possible to reduce the manufacturing time and costs.

BEST MODE

Hereinafter, a technical spirit of the present invention will be described in more detail with reference to the accompanying drawings.

The accompanying drawings are only examples shown in order to describe the technical idea of the present invention in more detail. Therefore, the technical idea of the present invention is not limited to shapes of the accompanying drawings.

Figure 1:
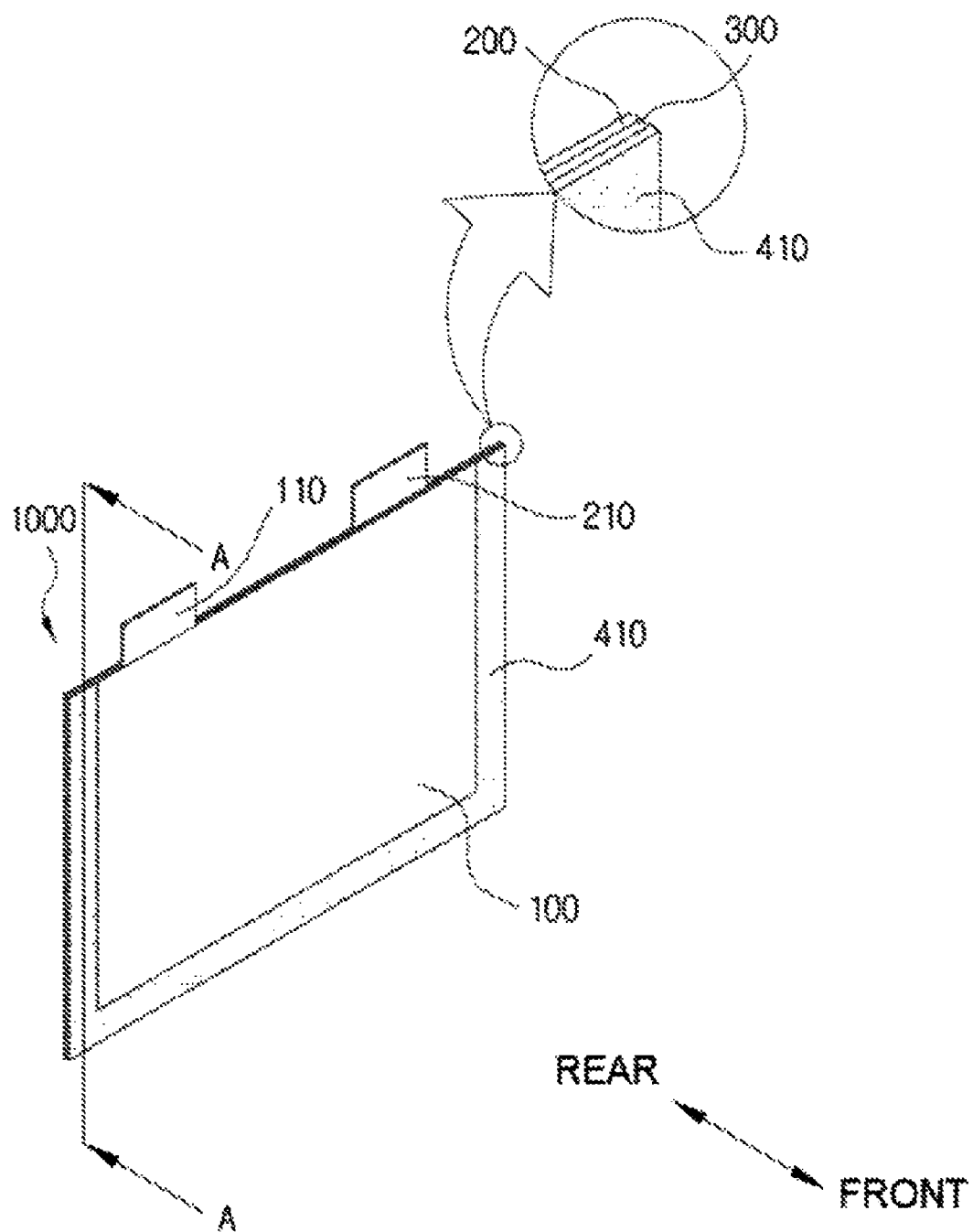
FIG. 1 is a perspective view illustrating an electrode assembly of a secondary battery according to Embodiment 1 of the present invention.
Figure 2:
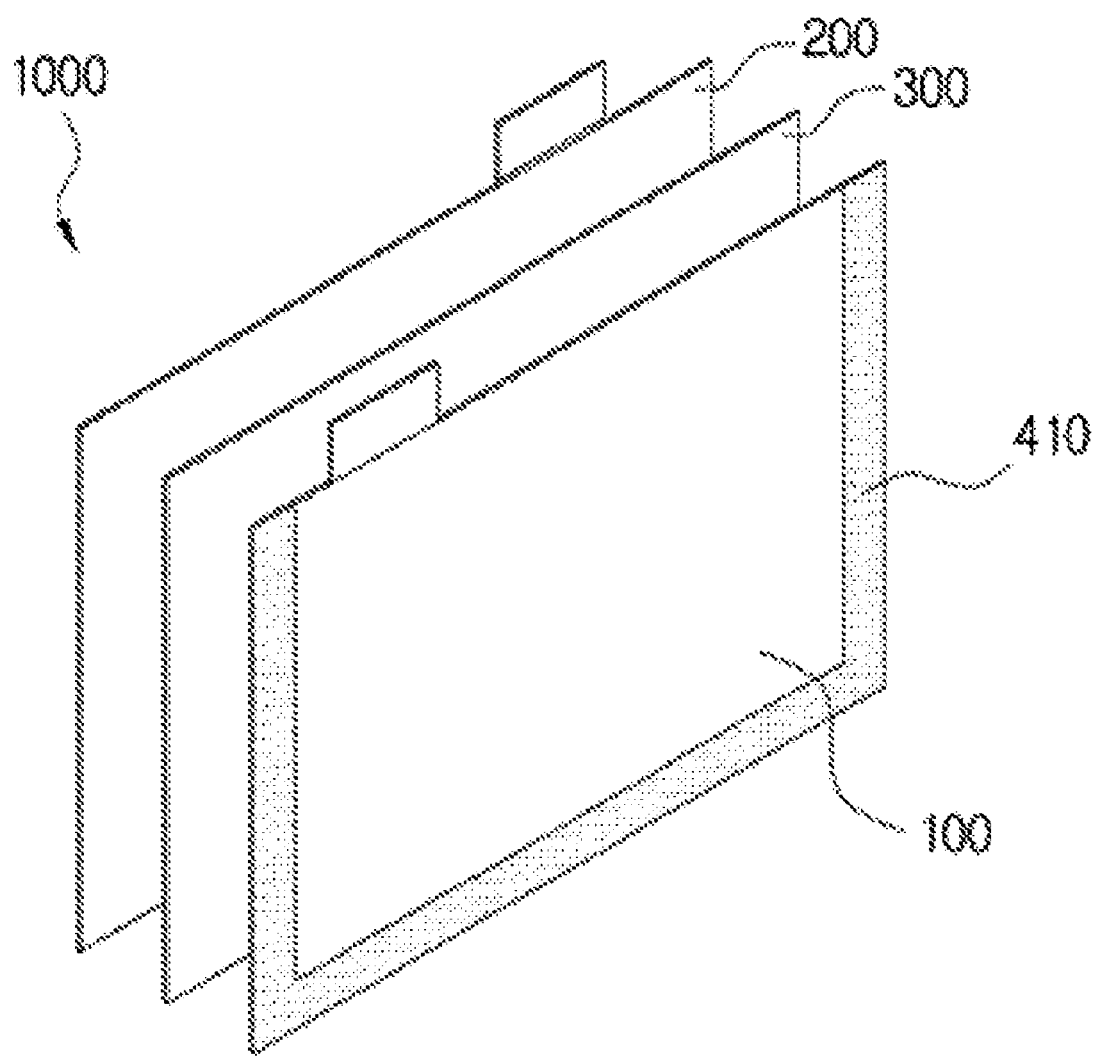
FIG. 2 is an exploded perspective view illustrating the electrode assembly of a secondary battery according to Embodiment 1 of the present invention.
Figure 3:
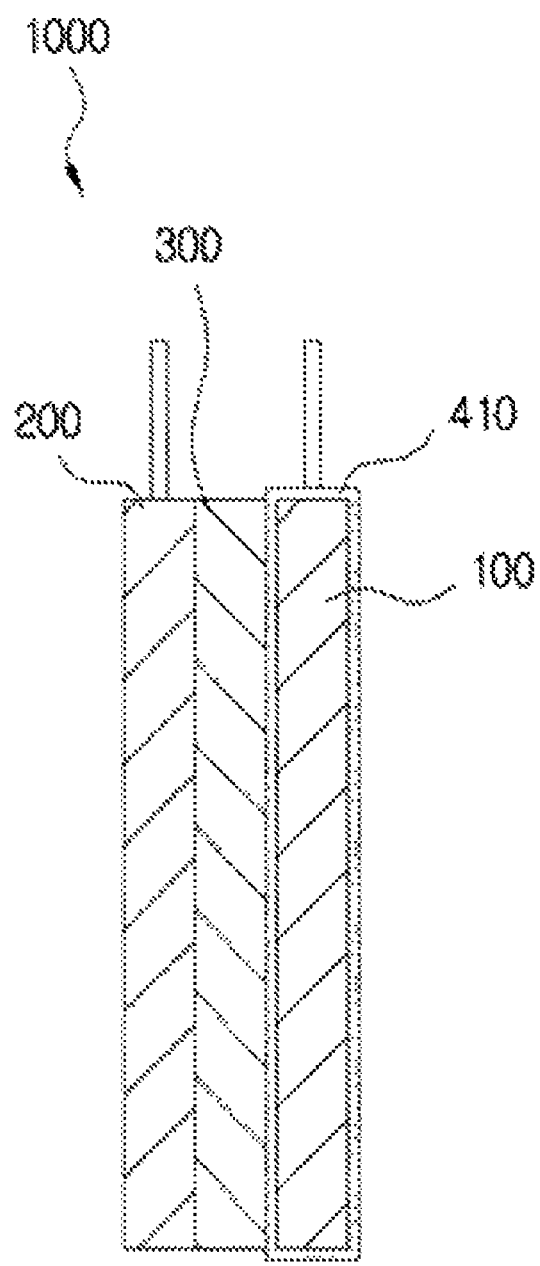
FIG. 3 is a cross-sectional view taken along line A-A' of FIG. 1.

FIG. 1 is a perspective view illustrating an electrode assembly of a secondary battery according to Embodiment 1 of the present invention, FIG. 2 is an exploded perspective view illustrating the electrode assembly of a secondary battery according to Embodiment 1 of the present invention, and FIG. 3 is a cross-sectional view taken along line A-A' of FIG. 1.

As illustrated in FIGS. 1 to 3, an electrode assembly 1000 of a secondary battery according to Embodiment 1 of the present invention is configured to include a first electrode unit 100, a second electrode unit 200, a separation membrane 300, and a first coating unit 410.

The first electrode unit 100 is a cathode and includes cathode active material layers which are coated on both surfaces of a cathode current collector formed of an aluminum (Al) foil. As the cathode active material, a chalcogenide compound is mainly used, but the exemplary embodiment of the present invention is not limited thereto. Further, the first electrode unit 100 may be coupled with the first electrode tap 110 for power connection.

The second electrode unit 200 is an anode and includes anode active material layers which are coated on both surfaces of an anode current collector formed of a copper (Cu) or nickel (Ni) foil. As the anode active material, carbon (C) based materials, Si, Sn, tin oxide, composite tin alloys, transition metal oxide, lithium metal nitride, lithium metal oxide, etc., are used, but the exemplary embodiment of the present invention is not limited thereto. Further, the second electrode unit 200 may be coupled with the second electrode tap 210 for power connection.

Meanwhile, the exemplary embodiments of the present invention in which the first electrode tab 110 and the second electrode tab 210 are formed in one side are illustrated in the drawings, but the first electrode tab 110 and the second electrode tab 210 may be formed in both sides and are not limited to the specific direction.

The separation membrane 300 serves to be interposed between the first electrode unit 100 and the second electrode unit 200 to separate the first electrode unit 100 from the second electrode unit 200 and is made of any one selected from a group consisting of polyethylene, polypropylene, and a co-polymer of polyethylene and polypropylene, but the exemplary embodiment of the present invention is not limited thereto.

The first coating unit 410 may be formed by coating an insulating member made of a metal oxide material along an edge portion of the first electrode unit 100. Herein, referring to a direction representation illustrated in FIG. 1, the edge portion of the first electrode unit 100 means front and rear surface edges of the first electrode unit 100 and a portion over a predetermined width from the front and rear surface edges of the first electrode unit 100 to a central side of the first electrode unit 100. That is, the first coating unit 410 may be formed by coating the insulating member over the predetermined width along the front and rear edges of the first electrode unit 100.

In this case, the first coating unit 410 is formed over some of the edge portion of the first electrode unit 100. When the first coating unit 410 is formed over the predetermined width along the front and rear edges of the first electrode unit 100, the insulating member is also coated on the first electrode tab 110 to hinder a power connection function of the first electrode tab 110, and as a result, it is preferable that the first coating unit 410 is not formed at a portion around one end at which the first electrode tab 110 of the first electrode unit 100 is formed.

A coating thickness of the first coating unit 410 may be 1 μm to 2 mm and the present applicant empirically and experimentally calculated the coating thickness of the first coating unit 410 in consideration of a gap between the first electrode unit 100 and the separation membrane 300, a coating time, and coating cost.

The first coating unit 410 serves to prevent the edge portion of the first electrode unit 100 and an edge portion of the second electrode unit 200 from being short-circuited with each other even though the edge portion of the first electrode unit 100 is connected to the edge portion of the second electrode unit 200 due to the deformation of the first electrode unit 100 or the second electrode unit 200 under the overcharging condition.

Therefore, according to Embodiment 1 of the present invention, it is possible to secure the stability of the electrode assembly 1000 of a secondary battery by preventing the internal short circuit which occurs due to the internal deformation under the overcharging condition.

Figure 4:
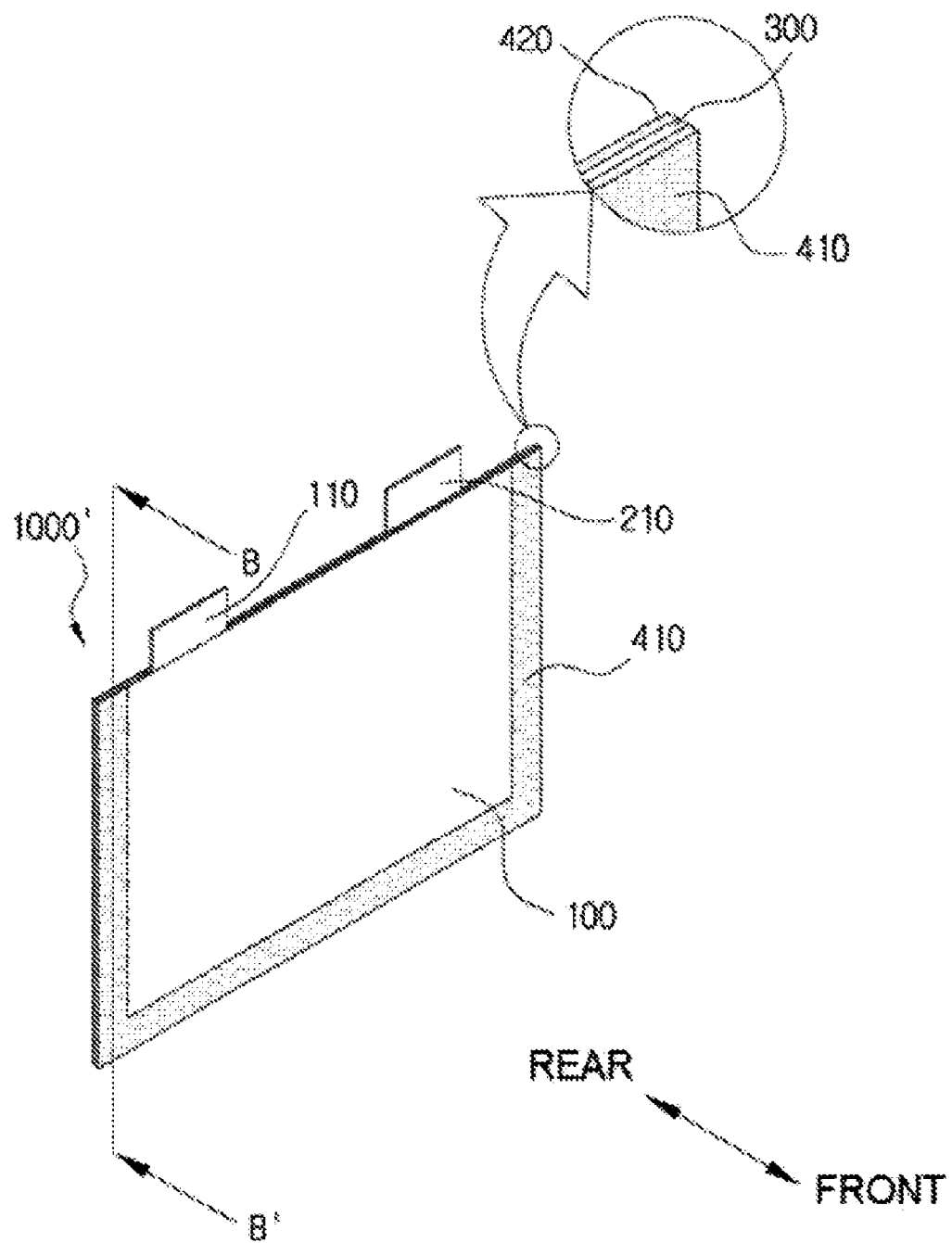
FIG. 4 is a perspective view illustrating an electrode assembly of a secondary battery according to Embodiment 2 of the present invention.
Figure 5:
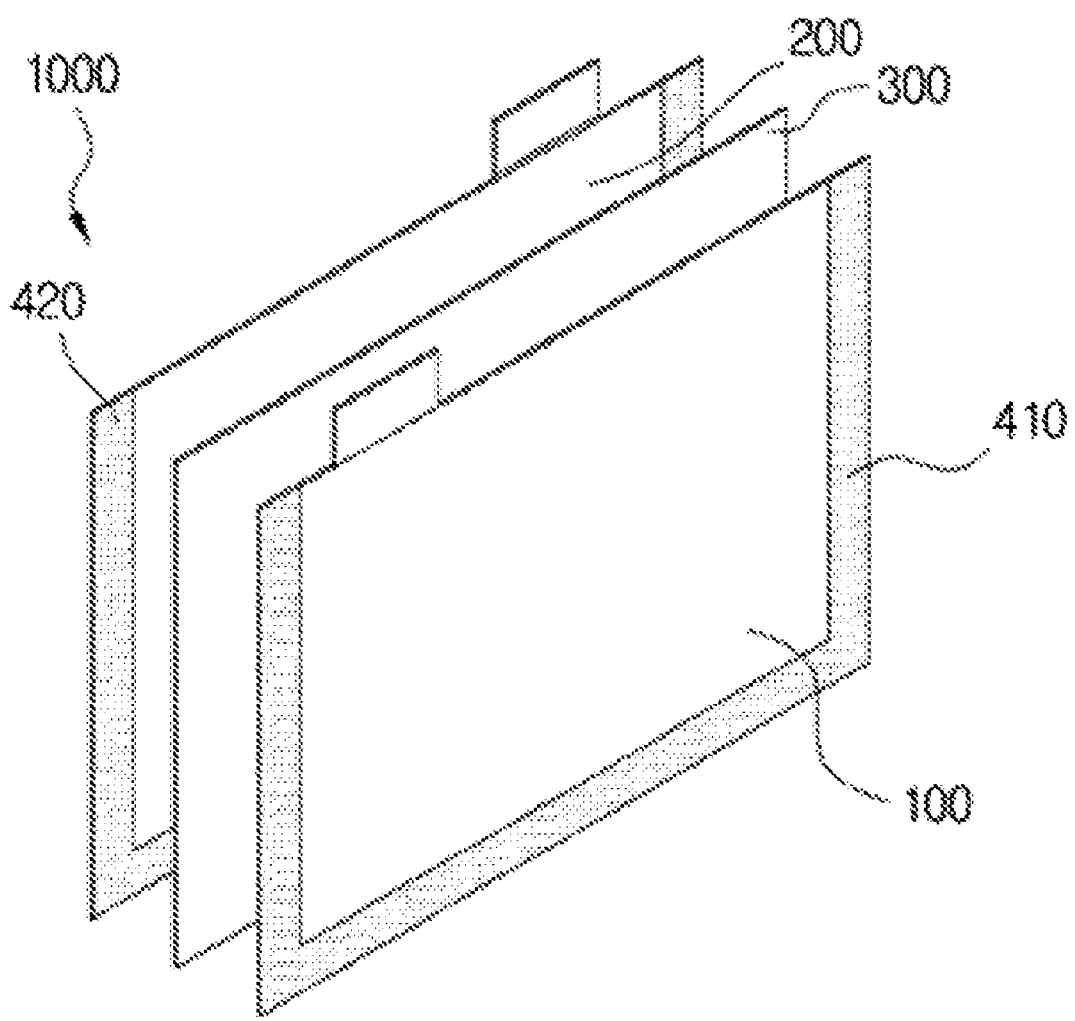
FIG. 5 is an exploded perspective view illustrating the electrode assembly of a secondary battery according to Embodiment 2 of the present invention.
Figure 6:
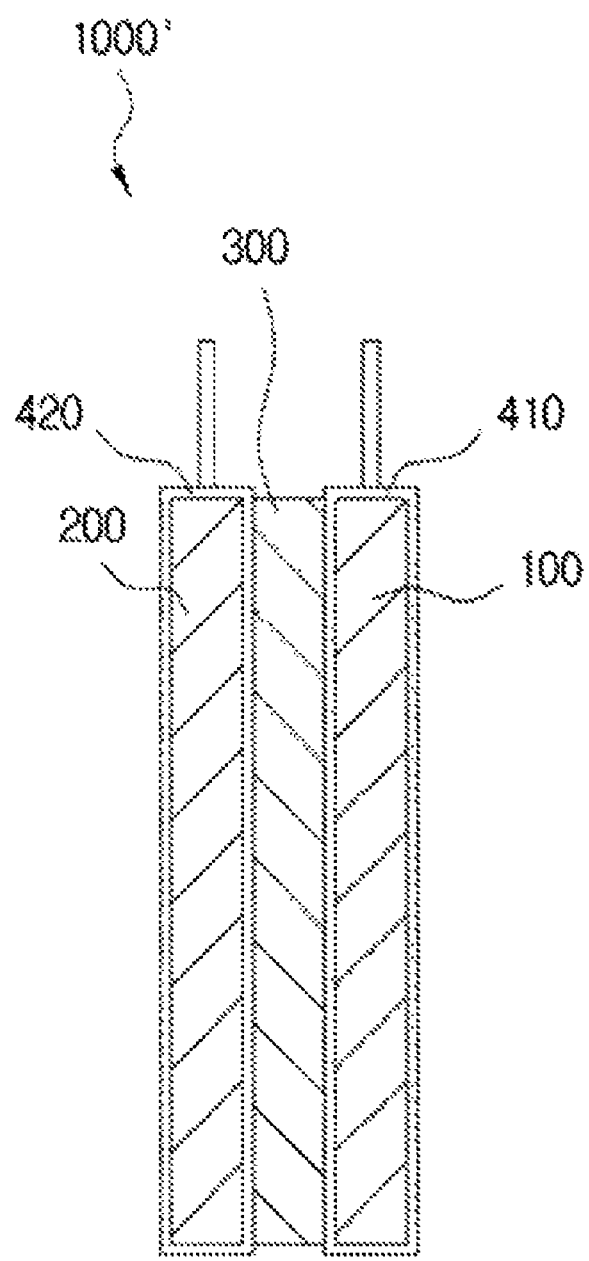
FIG. 6 is a cross-sectional view taken along the line B-B' of FIG. 4.

FIG. 4 is a perspective view illustrating an electrode assembly of a secondary battery according to Embodiment 2 of the present invention, FIG. 5 is an exploded perspective view illustrating the electrode assembly of a secondary battery according to Embodiment 2 of the present invention, and FIG. 6 is a cross-sectional view taken along the line B-B' of FIG. 4.

As illustrated in FIGS. 4 to 6, an electrode assembly 1000' of a secondary battery according to Embodiment 2 of the present invention is configured to include the first electrode unit 100, the second electrode unit 200, the separation membrane 300, the first coating unit 410, and a second coating unit 420.

The first electrode unit 100, the second electrode unit 200, the separation membrane 300, and the first coating unit 410 are already described in the electrode assembly 1000 of a secondary battery according to Embodiment 1 of the present invention, and therefore the detailed description thereof will be omitted.

The second coating unit 420 may be formed by coating the insulating member made of a metal oxide material along the edge portion of the second electrode unit 200. Here, referring to the direction representation illustrated in FIG. 4, the edge portion of the second electrode unit 200 means the front and rear surface edges of the second electrode unit 200 and a portion over a predetermined width from the front and rear edges of the second electrode unit 200 to a central side of the second electrode unit 200. That is, the second coating unit 410 is formed by coating the insulating member over a predetermined width along the front and rear edges of the second electrode unit 200.

In this case, the first coating unit 410 is formed over some of the edge portion of the first electrode unit 100. When the second coating unit 420 is formed over the predetermined width along the front and rear edges of the second electrode unit 200, the insulating member is also coated on the second electrode tab 210 to hinder a power connection function of the second electrode tab 210, and as a result, it is preferable that the second coating unit 420 is not formed at a portion around one end at which the second electrode tab 210 of the second electrode unit 200 is formed.

A coating thickness of the second coating unit 420 may be 1 μm to 2 mm and the present applicant empirically and experimentally calculated the coating thickness of the second coating unit 420 in consideration of a gap between the second electrode unit 200 and the separation membrane 300, a coating time, and coating cost.

Like the first coating unit 410, the second coating unit 420 also serves to prevent the edge portion of the first electrode unit 100 and the edge portion of the second electrode unit 200 from being short-circuited with each other even though the edge portion of the first electrode unit 100 is connected to the edge portion of the second electrode unit 200 due to the deformation of the first electrode unit 100 or the second electrode unit 200 under the overcharging condition.

The electrode assembly of a secondary battery according to Embodiment 2 of the present invention is configured to include the first coating unit 410 and the second coating unit 420 to prevent the internal short circuit occurring due to the internal deformation under the overcharging condition with more stability, as compared with the case in which the electrode assembly of a secondary battery is configured to include only the first coating unit 410.

Therefore, according to Embodiment 2 of the present invention, it is possible to more secure the stability of the electrode assembly 1000 of a secondary battery by preventing the internal short circuit occurring due to the internal deformation under the overcharging condition with more stability.

Meanwhile, the insulating member is made of a metal oxide which may be any one selected from a group consisting of aluminum (Al), silicon (Si), titanium (Ti), vanadium (V), chromium (Cr), manganese (Mn), iron (Fe), cobalt (Co), nickel (Ni), zinc (Zn), zirconium (Zr), niobium (Nb), molybdenum (Mo), and barium (Ba), but the exemplary embodiment of the present invention is not limited thereto.

Here, the metal oxide is prepared by a relatively simple manufacturing process and has strong resistance against heat or chemicals.

Therefore, the exemplary embodiment of the present invention may configure the insulating member using the metal oxide which is prepared by the relatively simple manufacturing process, thereby reducing the manufacturing time and costs.

Meanwhile, the first coating unit and the second coating unit which are formed by coating the insulating member on the edge portions of the first electrode unit and the second electrode unit may be coated by using coating methods such as gravure coating, roll coating, and screen coating.

Further, the coating shape of the first coating unit and the second coating unit is a shape in which metal oxide particles are continued, but the first coating unit and the second coating unit may have various shapes such as a lattice shape, a honeycomb shape, and a comb shape, if necessary, and therefore the exemplary embodiment of the present invention is not limited thereto.

Further, the insulating member is manufactured by a mixture of the metal oxide particles and a binder, but a larger amount of metal oxide particles than the binder may be used. Here, it is preferable to use a first composite of 70 to 99.9 wt % of metal oxide particles and 0.1 to 30 wt % of binder or a second composite of 90 to 99.9 wt % of metal oxide particles and 0.1 to 10 wt % of binder. However, the insulation of the metal oxide particles and the mixing ratio of the binder are not limited thereto.

In this case, a size of the metal oxide particles mixed with the binder in the insulating member preferably ranges from 0.1 to 1.0 μm. As the size of the metal oxide particles is increased, roughness of the first coating unit and the second coating unit is increased but the time to process the metal oxide into a particle form is short. And as the size of the metal oxide particles is reduced, the roughness of the first coating unit and the second coating unit is reduced but the time to process the metal oxide into a particle form is long. Therefore the metal oxide particles may preferably have the size as described above.

As the binder, a binder resin may be used, for example, various kinds of polyesters, various kinds of acrylics, various kinds of fluoropolymers (ex, polyvinylidene fluoride (PVDF)), polyimide-based resin, carboxymethyl cellulose (CMC), and the like may be used, but the exemplary embodiment of the present invention is not limited thereto.

Further, as a solvent for adjusting viscosity and solid content of the insulating member, N-methyl-2-pyrrolidone (NMP), acetone, tetrahydrofuran (THF), water, hydrocarbon solvents such as hexane, ketone solvents, ether solvents, ester solvents, and the like may be used, but the exemplary embodiment of the present invention is not limited thereto.

Figure 7:
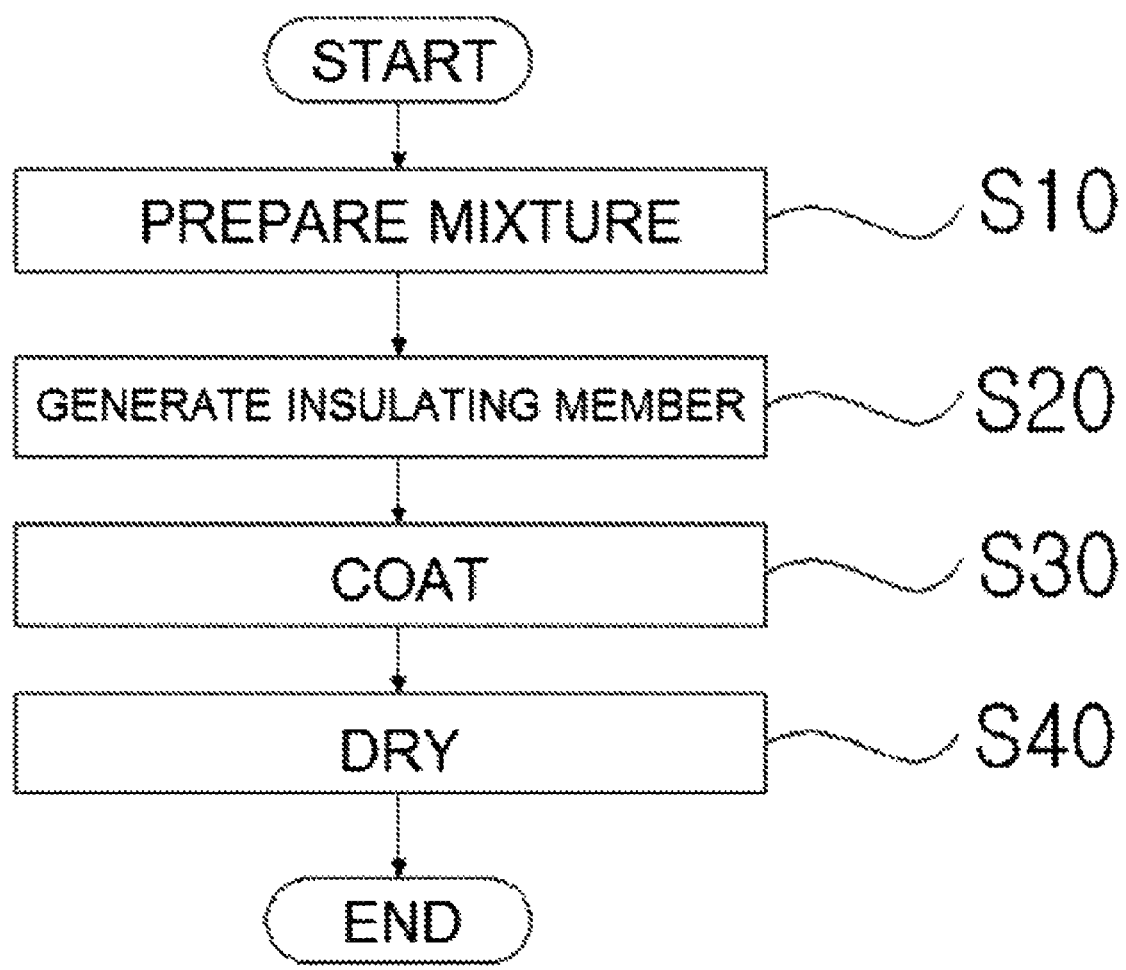
FIG. 7 is a flow chart illustrating a method of coating an insulating member in the electrode assembly of a secondary battery according to Embodiment 2 of the present invention.

FIG. 7 is a flow chart illustrating a method for forming a first coating unit and a second coating unit by coating an insulating member on edge portions of a first electrode unit and a second electrode unit in an electrode assembly of a secondary battery according to Embodiment 2 of the present invention.

As illustrated in FIG. 7, the method for forming a first coating unit and a second coating unit by coating an insulating member on edge portions of a first electrode unit and a second electrode unit in an electrode assembly of a secondary battery according to Embodiment 2 of the present invention is configured to include preparing a mixture (S10), generating the insulating member (S20), coating (S30), and drying (S40).

In the preparing of the mixture (S10), an agitator agitates the binder with the solvent to prepare the mixture. In this case, when an agitating time is too long, a grain size of the binder is small and crystallinity of the binder due to overdispersion is increased to reduce a binder strength, and when the agitating time is too short, the grain size of the binder is increased and the protrusion and roughness of a surface are increased. Therefore, the agitating time is preferably controlled by a discharge amount of the agitator. As a result, the agitating time preferably ranges from 30 minutes to 4 hours in consideration of 0.01 kg/min to 10 kg/min which is the discharge amount of the agitator.

In the generating of the insulating member (S20), the insulating member is generated by injecting the metal oxide into the mixture prepared in the preparing of the mixture (S10) and then agitating it. In this case, when an agitating time is too long, the grain size of the metal oxide is small and the crystallinity of the binder contained in the mixture due to over-dispersion is increased to reduce the binder strength, and when the agitating time is too short, the grain size of the metal oxide is increased and the protrusion and roughness of a surface are increased. Therefore, the agitating time is preferably controlled by a discharge amount of the agitator. As a result, the agitating time preferably ranges from 30 minutes to 4 hours in consideration of 0.01 kg/min to 10 kg/min which is the discharge amount of the agitator.

In the coating (S30), the first coating unit and the second coating unit are formed by coating the insulating member generated in the generating of the insulating member (S20) on the edge portions of the first electrode unit and the second electrode unit by the gravure coating. In this case, the gravure coating preferably uses a gravure roll which has a coating speed of 1 to 50 m/min and a ratio of 20% to 200% to reduce the roughness of the first coating unit and the second coating unit.

In the drying (S40), the first coating unit and the second coating unit are dried by using an air blower. In this case, the air blower preferably has a hot blast temperature of 80° C. to 140° C. and a hot wind velocity of 800 to 2500 m/s to prevent the thermal deformation of the first coating unit and the second coating unit The present invention is not limited to the above-mentioned exemplary embodiments, and may be variously applied, and may be variously modified without departing from the gist of the present invention claimed in the claims.

DETAILED DESCRIPTION OF MAIN ELEMENTS 1000, 1000': Electrode assembly of secondary battery according to the Invention
100: First electrode unit
110: First electrode tab
200: Second electrode unit
210: Second electrode tab
300: Separation membrane
410: First coating unit
420: Second coating unit

The invention claimed is:

1. An electrode assembly of a secondary battery, comprising:
a first electrode unit and a second electrode unit;
a separation membrane interposed between the first electrode unit and the second electrode unit; and
a first coating unit having an insulating member which is coated using one coating method selected from the group consisting of gravure coating, roll coating, and screen coating on front and rear surface edges of the first electrode unit and a portion over a predetermined width from the front and rear surface edges of the first electrode unit toward a central side of the first electrode unit,
wherein the first electrode unit has a rectangular plate shape and a first electrode tab for power connection protrudes in one way or two ways of the rectangular plate, and the first coating unit is coated on the rest sides other than sides at which the first electrode tab of the first electrode unit is present.

2. The electrode assembly of claim 1, further comprising:
a second coating unit having an insulating member which is coated using one coating method selected from the group consisting of gravure coating, roll coating, and screen coating on front and rear edges of the second electrode unit and a portion over a predetermined width from the front and rear surface edges of the second electrode unit toward a central side of the second electrode unit.

3. The electrode assembly of claim 2, wherein the second electrode unit has a rectangular plate shape and a second electrode tab for power connection protrudes in one way or two ways of the rectangular plate, and
the second coating unit is coated on the rest sides other than sides at which the second electrode of the second electrode unit is present.

4. The electrode assembly of claim 2, wherein a thickness of each of the first coating unit and the second coating unit ranges from 1 μm to 2 mm.

5. The electrode assembly of claim 2, wherein the first electrode unit is a cathode which includes a cathode current collector and a cathode active material coated on the cathode current collector, and
the second electrode unit is an anode which includes an anode current collector and an anode active material coated on the anode current collector.

6. The electrode assembly of claim 1, wherein the insulating member is made of a metal oxide selected from a group consisting of aluminum (Al), silicon (Si), titanium (Ti), vanadium (V), chromium (Cr), manganese (Mn), iron (Fe), cobalt (Co), nickel (Ni), zinc (Zn), zirconium (Zr), niobium (Nb), molybdenum (Mo), and barium (Ba).

7. An electrode assembly of a secondary battery, comprising:
a first electrode unit and a second electrode unit;
a separation membrane interposed between the first electrode unit and the second electrode unit;
a first coating unit having an insulating member which is coated using one coating method selected from the group consisting of gravure coating, roll coating, and screen coating on front and rear surface edges of the first electrode unit and a portion over a predetermined width from the front and rear surface edges of the first electrode unit to a central side of the first electrode unit; and
a second coating unit having an insulating member which is coated using one coating method selected from the group consisting of gravure coating, roll coating, and screen coating on front and rear surface edges of the second electrode unit and a portion over a predetermined width from the front and rear surface edges of the second electrode unit toward a central side of the second electrode unit.

8. The electrode assembly of claim 7, wherein the first electrode unit is a cathode which includes a cathode current collector and a cathode active material coated on the cathode current collector, and
the second electrode unit is an anode which includes an anode current collector and an anode active material coated on the anode current collector.

9. The electrode assembly of claim 7, wherein the insulating member is made of a metal oxide selected from a group consisting of aluminum (Al), silicon (Si), titanium (Ti), vanadium (V), chromium (Cr), manganese (Mn), iron (Fe), cobalt (Co), nickel (Ni), zinc (Zn), zirconium (Zr), niobium (Nb), molybdenum (Mo), and barium (Ba).

* * * * *